(12) United States Patent
Marroux

(10) Patent No.: US 12,489,988 B2
(45) Date of Patent: Dec. 2, 2025

(54) DRIVING ASSISTANCE SYSTEM, AND ASSOCIATED IMAGE PROCESSING METHOD

(71) Applicant: VALEO SYSTEMES D'ESSUYAGE, La Verriere (FR)

(72) Inventor: Olivier Marroux, La Verriere (FR)

(73) Assignee: Valeo Systemes d'Essuyage, La Verriere (FR)

(*) Notice: Subject to any disclaimer, the term of this patent is extended or adjusted under 35 U.S.C. 154(b) by 36 days.

(21) Appl. No.: 18/564,347

(22) PCT Filed: May 17, 2022

(86) PCT No.: PCT/EP2022/063264
§ 371 (c)(1),
(2) Date: Nov. 27, 2023

(87) PCT Pub. No.: WO2022/253564
PCT Pub. Date: Dec. 8, 2022

(65) Prior Publication Data
US 2024/0251173 A1     Jul. 25, 2024

(30) Foreign Application Priority Data
May 29, 2021   (FR) ...................................... 2105633

(51) Int. Cl.
*H04N 23/81*   (2023.01)
*G02B 27/00*   (2006.01)
(Continued)

(52) U.S. Cl.
CPC ......... *H04N 23/81* (2023.01); *G02B 27/0006* (2013.01); *H04N 23/52* (2023.01); *H04N 23/55* (2023.01); *H04N 23/80* (2023.01)

(58) Field of Classification Search
CPC ........ H04N 23/81; H04N 23/52; H04N 23/55; H04N 23/80; H04N 23/72; H04N 23/811;
(Continued)

(56) References Cited

U.S. PATENT DOCUMENTS 10,623,727 B1 * 4/2020 Frevert ................ H04N 17/002
10,676,071 B2   6/2020 Dusina et al.
(Continued)

FOREIGN PATENT DOCUMENTS

JP     H6-174999 A     6/1994
JP     2003-304532 A   10/2003
(Continued)

OTHER PUBLICATIONS

European Patent Office, International Search Report (with English translation) and Written Opinion of corresponding International Application No. PCT/EP2022/063264, dated Sep. 14, 2022.
(Continued)

*Primary Examiner* — Nasim N Nirjhar
(74) *Attorney, Agent, or Firm* — Valeo Systemes d'Essuyage

(57) ABSTRACT

A driving assistance system including at least one optical sensor and at least one associated protection device with an optical element that is transparent and mounted so as to be able to rotate. The protection device includes at least one acquisition element for acquiring at least one item of information representative of at least one angular position of the optical element on capture of an image. The system further includes a processing unit configured to detect the presence of at least one defect in the optical element, to receive the item of information representative of the angular position of the optical element, to determine at least one angular position of the defect in the optical element based thereon, and to use image processing to remove the defect in the captured
(Continued)

image, taking into account the determined angular position of the defect in the optical element.

11 Claims, 3 Drawing Sheets

(51) Int. Cl.
  *H04N 23/52* (2023.01)
  *H04N 23/55* (2023.01)
  *H04N 23/80* (2023.01)
(58) Field of Classification Search
  CPC .............. H04N 25/61; G02B 27/0006; G02B 27/0018; G06T 5/77; G06T 2207/10016; G06T 2207/30252
  See application file for complete search history.

(56) References Cited

U.S. PATENT DOCUMENTS

| | | | |
|---|---|---|---|
| 10,735,716 | B2 | 8/2020 | Herman et al. |
| 10,757,320 | B2 | 8/2020 | Wendel et al. |
| 10,843,668 | B2 | 11/2020 | Bretagnol et al. |
| 11,172,192 | B2 | 11/2021 | Lu et al. |
| 2019/0068829 | A1 | 2/2019 | Van Schoyck et al. |
| 2019/0106085 | A1 | 4/2019 | Bacchus et al. |
| 2019/0219161 | A1* | 7/2019 | Minegishi ............... F16H 61/12 |
| 2019/0329737 | A1 | 10/2019 | Bretagnol et al. |
| 2020/0174345 | A1* | 6/2020 | Fujiki .................... H04N 23/60 |
| 2021/0094474 | A1* | 4/2021 | Vetter .................... B60S 1/528 |
| 2021/0203827 | A1* | 7/2021 | Frevert ................ H04N 25/671 |

FOREIGN PATENT DOCUMENTS

| | | |
|---|---|---|
| JP | 2008158343 A | 7/2008 |
| JP | 2019-537538 A | 12/2019 |
| JP | 2021-052319 A | 4/2021 |
| WO | 2016/207987 A1 | 12/2016 |

OTHER PUBLICATIONS

Japanese Patent Office, First Office action (with English translation) corresponding to the Japanese patent application No. 2023-573488 dated Dec. 24, 2024.
Japanese Patent Office, Search report results corresponding to the Japanese patent application No. 2023-573488 dated Dec. 19, 2024.
Japanese Patent Office, Second Office action (with English translation) corresponding to the Japanese patent application No. 2023-573488 dated Jun. 3, 2025.

* cited by examiner

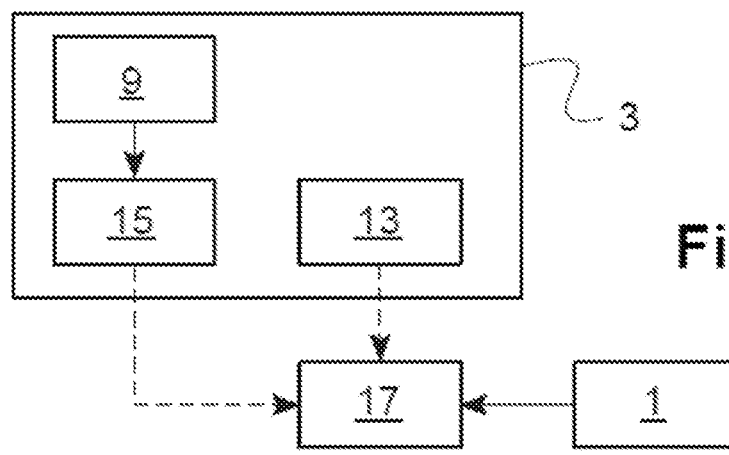
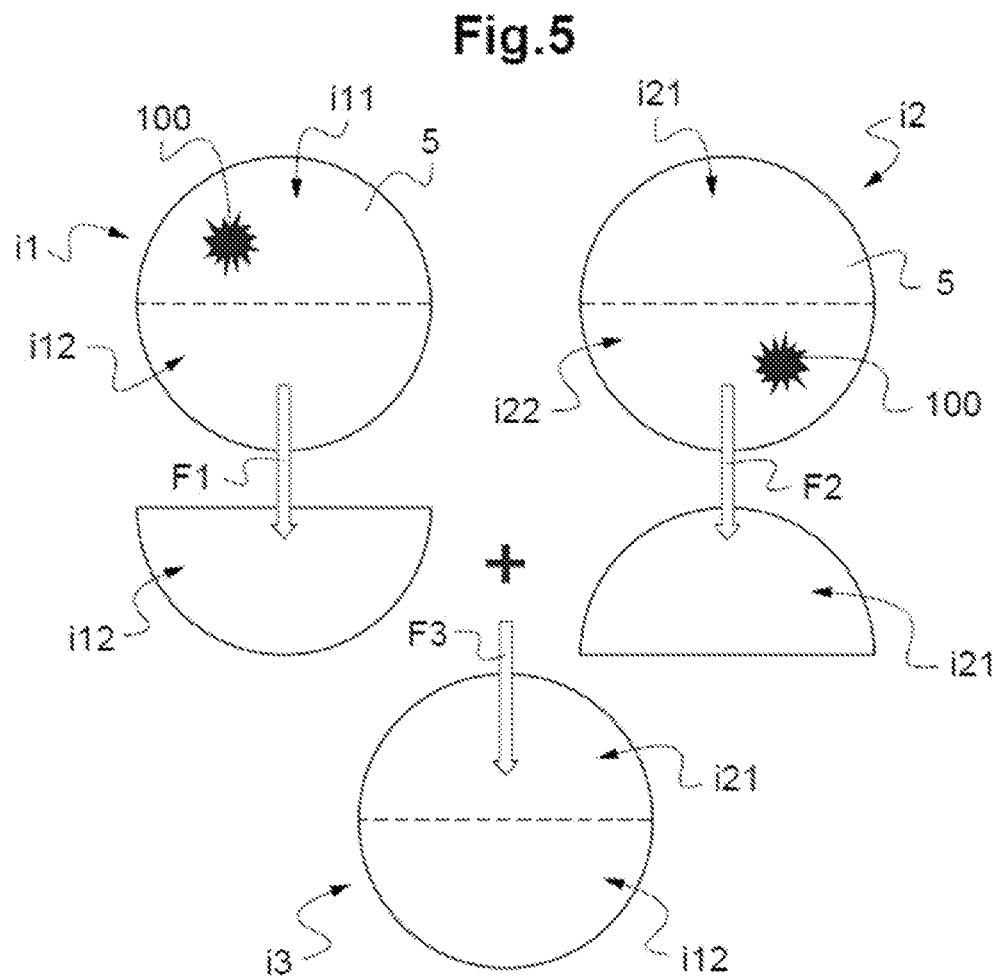

DRIVING ASSISTANCE SYSTEM, AND ASSOCIATED IMAGE PROCESSING METHOD

TECHNICAL FIELD

The present invention relates to the field of assisting drivers and in particular to the driver-assistance systems that are installed in certain vehicles, a driver-assistance system of this type potentially comprising at least one optical sensor. The present invention also relates to an associated image-processing method.

BACKGROUND OF THE INVENTION

Nowadays, optical sensors such as cameras, LIDARs (acronym of "light detection and ranging" or "laser imaging, detection, and ranging") or other sensors based on emission and/or detection of light in spectra visible or invisible to humans, and in particular in the infrared, are increasingly fitted to motor vehicles. They in particular form part of driver-assistance systems, such as parking assistance systems, or systems for detecting lane departure.

In particular, it is known to equip motor vehicles with rear-view cameras for parking assistance, allowing obstacles located behind the vehicle to be detected. These cameras may be installed in the interior of the passenger compartment, for example against the rear windscreen and pointing rearward through the rear windscreen of the vehicle. They are then well protected from bad weather and dirt caused by organic or inorganic contaminants.

However, the viewing angle is not optimal, in particular for parking assistance, because such cameras, located inside the passenger compartment, do not necessarily allow obstacles located in proximity to the rear of the motor vehicle for example to be seen.

For this reason, it is preferable to arrange the one or more cameras of driver-assistance systems on the exterior of motor vehicles in various locations depending on the desired use, for example in the front or rear bumper, or near the front or rear license plate of the vehicle. However, in this case, such a camera is highly exposed to being spattered with mineral or organic dirt or soiling, which may be deposited on its optics and thus decrease its effectiveness, or even render it inoperable, this potentially greatly affecting the operability of the driver-assistance system comprising such a camera.

To prevent dirt from being deposited on such a camera, it is known to arrange an optical element such as a transparent protective lens in front of the camera, and thus to protect the latter from external attack. However, the protective lens remains subject to external attack and may be soiled or even damaged.

In order to allow it to be cleaned via a centrifugal effect, the protective lens is arranged to be rotatable. However, such cleaning may prove to be insufficient to remove certain types of hard-to-remove soiling, such as tar for example. In addition, the protective lens is also exposed to impacts, for example with objects during driving, that may create scratches or chips or other damage. This generates defects that degrade and darken the images taken by the optical sensor because of the movement of the defects during the rotation of the protective lens. Therefore, the field of view and the quality of images taken by the optical sensor may be affected.

SUMMARY OF THE INVENTION

The present invention proposes to at least partially remedy the aforementioned drawbacks by providing an alternative allowing degradation of images taken by the optical sensor to be avoided in the event of presence of a defect on the upstream optical element.

To this end, one subject of the invention is a driver-assistance system comprising: at least one optical sensor comprising optics and configured to capture at least one image along an optical axis, and at least one protective device associated with said at least one optical sensor, said device comprising a transparent optical element that is rotatably mounted upstream of the optics of the associated optical sensor along the optical axis, and comprising a motor configured to drive the optical element to rotate.

According to the invention, the protective device comprises at least one element for acquiring at least one piece of information representative of at least one angular position of the optical element during capture of at least one image by the associated optical sensor.

Said system comprises a processing unit configured to:
- detect the presence of at least one defect on the optical element,
- receive said at least one piece of information representative of said at least one angular position of the optical element,
- determine, based on said at least one received representative piece of information, at least one angular position of said at least one defect on the optical element, and
- remove by image processing said at least one defect from said at least one image captured by said at least one optical sensor, taking into account said at least one determined angular position of said at least one defect on the optical element.

More particularly, the optical element is mounted so as to be rotatable about an axis of rotation.

Specifically, the motor is configured to drive the optical element to rotate about an axis of rotation, so as to allow the optical element to be cleaned via a centrifugal effect.

The driver-assistance system may further comprise one or more of the following features described below, separately or in combination.

According to one aspect, the motor comprises a fixed stator and a rotor that is rotatable about an axis of rotation with respect to the fixed stator. The motor may have a speed of rotation comprised between 1000 and 50000 revolutions/minute, preferably between 5000 and 20000 revolutions/minute, and even more preferably between 7000 and 15000 revolutions/minute.

Thus, the motor is configured to make the optical element continuously rotate in front of the optical sensor when the latter is in operation, at a speed of rotation such that any dirt is ejected from the optical element via a centrifugal effect. Specifically, the work done by the centrifugal force is enough to overcome the force of adhesion of the dirt to the optical element. Thus, the optical sensor maintains good operability and fouling thereof is limited whatever the weather conditions. The driver-assistance system thus maintains good visibility.

According to one aspect, the motor is arranged on the side opposite the optical element. In this case, the axis of rotation of the motor may be coincident with the optical axis.

According to one aspect, the protective device advantageously comprises a holder, or casing, mounted so as to be rotatable about the axis of rotation.

The holder may define a housing for accommodating the optical sensor, for example so that the optical axis of the optical sensor coincides with the axis of rotation of the holder.

Thus, the protective device comprises a fixed portion comprising the stator, and a mobile portion comprising the rotor, the holder and the optical element.

According to one aspect, the optical element is mounted so as to rotate as one with the holder and is configured to be placed at the front of the holder. The expression "front of the holder" is understood to mean that portion of the holder which is intended to be placed facing the road scene images of which the optical sensor participates in capturing, when the protective device is mounted on the motor vehicle. In contrast, the expression "rear of the holder" is understood to mean that portion of the holder which is opposite the front of the holder and which is therefore the portion that is furthest from the road scene.

According to one aspect, the processing unit may be configured to: determine said at least one angular position of the optical element based on said at least one received representative piece of information, and deduce, from said at least one determined angular position of the optical element, said at least one angular position of said at least one defect on the optical element.

According to another aspect, the processing unit may be configured to: receive or determine at least one piece of information representative of the speed of rotation of the optical element, and synchronize the image capture with the speed of rotation of the optical element.

Said at least one acquiring element may comprise a rotation indicator placed on the optical element, and arranged to be in the field of view of the associated optical sensor.

The rotation indicator commonly called an OPR indicator may be a reflective element. It may take the form of a bar, for example non-limitingly one made of aluminum. According to another variant, the rotation indicator may take the form of a known, non-random defect, such as an engraving, on the optical element.

As a variant or in addition, said at least one acquiring element may comprise an angle sensor. Preferably it is a sensor of absolute angle.

The angle sensor may be placed on the mobile portion of the protective device, in particular on the optical element or its holder, or on the rotor, for example in the region where the rotor is coupled to the stator.

Non-exhaustively, the angle sensor may be magnetic, optical and in particular employ a photodiode or phototransistor to detect reflection or transmission of light generated by a light-emitting diode or laser diode, or even holographic.

The processing unit comprises at least one processing means for determining the position of the optical element based on at least one angle measurement transmitted by the angle sensor arranged in the protective device.

According to yet another variant or in addition, said at least one acquiring element may comprise a measuring unit configured to measure phase currents of the motor.

The measuring unit may comprise one or more measuring resistors such as shunts allowing the amplitude of the current to be measured.

According to another aspect, the processing unit may be configured to define, depending on the speed of rotation of the optical element, an image-capture frequency, so that, on each image capture, said at least one defect is in said at least one determined angular position in the captured image.

The processing unit may comprise at least one image-processing means configured to extract said at least one defect located in said at least one determined angular position in the captured image.

According to yet another aspect, said at least one optical sensor may be configured to capture at least two consecutive images.

Said at least one image-processing means may be configured to extract from said at least two images at least one region containing said at least one defect, and to superpose said at least two images, so as to construct a new image devoid of said at least one defect.

The invention also relates to a device for protecting an optical sensor for a driver-assistance system such as defined above, comprising a transparent optical element that is configured to be rotatably mounted upstream of the optical sensor along its optical axis, and a motor configured to drive said optical element to rotate. Said device advantageously comprises at least one element for acquiring at least one piece of information representative of at least one angular position of the optical element during capture of an image by the optical sensor.

The invention also relates to an associated method for processing captured images, for a driver-assistance system such as defined above, comprising at least one optical sensor and an associated protective device. Said method comprises the following steps:
- detecting the presence of at least one defect on the optical element of the protective device, for example by means of the processing unit,
- receiving at least one piece of information representative of at least one angular position of the optical element during capture of at least one image by the optical sensor, for example by means of said at least one acquiring element of the protective device,
- determining, based on said at least one received representative piece of information, at least one angular position of said at least one defect on the optical element, for example by means of the processing unit in particular by image processing,
- removing by image processing said at least one defect from at least one image captured by said at least one optical sensor, taking into account said at least one determined angular position of said at least one defect on the optical element, for example by means of the processing unit.

Said method may further comprise the following sub-steps:
- based on said at least one acquired representative piece of information, determining said at least one angular position of the optical element, for example by means of the processing unit,
- based on said at least one determined angular position of the optical element, deducing at least one angular position of said at least one defect on the optical element, for example by means of the processing unit in particular by image processing.

Said method may further comprise the following steps: receiving or determining at least one piece of information representative of the speed of rotation of the optical element, and synchronizing the image capture with the speed of rotation of the optical element.

Said at least one defect is removed by image processing from at least one image captured by said at least one optical sensor in a manner synchronized with the speed of rotation of the optical element, taking into account said at least one determined angular position of said at least one defect on the optical element. In this case it is a method for synchronizing of image capture and processing of captured images.

BRIEF DESCRIPTION OF DRAWINGS

Further advantages and features of the invention will become more clearly apparent on reading the following description, which is given by way of illustrative and non-limiting example, and the appended drawings, in which:

FIG. 3b is a rear perspective view of the mobile portion of the protective device in FIG. 3a.

FIG. 4 is a schematic representation showing the interaction between the protective device and a processing unit of the driver-assistance system.

FIG. 5 schematically shows image-processing steps used to remove a defect from images captured by the optical sensor.

DETAILED DESCRIPTION OF THE INVENTION

In these figures, identical elements have been designated by the same reference numbers.

The following embodiments are examples. Although the description refers to one or more embodiments, this does not necessarily mean that each reference relates to the same embodiment, or that the features apply only to a single embodiment. Individual features of various embodiments may also be combined or interchanged to create other embodiments.

The invention relates to a driver-assistance system with which a motor vehicle is intended to be equipped. The driver-assistance system may in particular comprise one or more optical detecting devices such as optical sensors, for example for parking assistance, or contributing in particular to autonomous driving. It is advantageously a question of optical sensors intended to be located on-board the motor vehicle.

Assistance System

Figure 1:
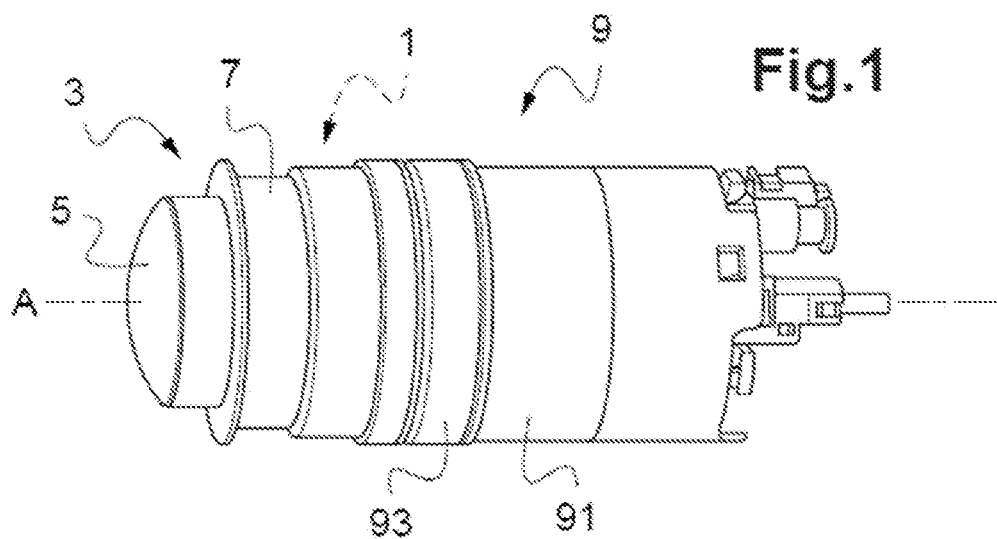
FIG. 1 shows one example of a protective device of an optical sensor for a driver-assistance system.

With reference to FIG. 1, the driver-assistance system in particular comprises at least an optical sensor 1 and an associated protective device 3.

The optical sensor 1 is configured to capture at least one image along an optical axis. The optical sensor 1 is for example an image-capturing optical sensor 1 such as a camera. It may be a CCD sensor (CCD standing for "charge-coupled device") or a CMOS sensor comprising a matrix array of miniature photodiodes. According to another variant, it may be a LIDAR sensor (LIDAR standing for "light detection and ranging" or "laser imaging, detection, and ranging").

Moreover, the optical sensor 1 comprises optics such as a lens. The optics may be convex (curved), with a convexity oriented towards the exterior of the optical sensor 1. It may for example be a question of a so-called fish-eye lens.

The optical sensor 1 may be housed inside the protective device 3, as illustrated in the example of FIG. 1. The protective device 3 may be mounted at the front or rear or on the sides of the motor vehicle. It may be installed on any element of the motor vehicle, such as a bodywork element or an exterior element, and for example in a bumper or near the license plate, or near one of the rear-view mirrors. The protective device 3 may be fastened in place using any known technique.

The protective device 3 comprises an optical element 5 that is intended to protect the optics of the optical sensor 1. It is therefore an element or mask for protecting the optical sensor 1.

The optical element 5 is placed upstream of the optics of the optical sensor 1. Herein, the term upstream is defined with respect to the optical axis of the optical sensor 1. The optical element 5 is therefore intended to be placed between the optics of the optical sensor 1 and the road scene along the optical axis. Thus, this optical element 5 will potentially be subject to attack from the exterior, i.e. to being struck not only by water, contaminants and dirt, but also by solid debris, such as gravel, that could damage the optics of the optical sensor 1. The optical element 5 is advantageously dimensioned so as to cover the entire optical surface of the optical sensor 1.

The optical element 5 is transparent so as not to decrease the effectiveness of the optical sensor 1. It may be made of glass or a transparent plastic. It is for example a question of a lens distinct from the optics of the optical sensor 1, and that may therefore be external to the optical sensor 1.

The optical element 5 is mounted so as to be rotatable about an axis of rotation A. The optical element 5 is, in the illustrated example, placed centrally with respect to the axis of rotation A.

Furthermore, the protective device 3 advantageously comprises a holder 7, or casing, mounted so as to be rotatable about the axis of rotation A.

The holder 7 may define a housing for accommodating the optical sensor 1, for example so that the optical axis of the optical sensor 1 coincides with the axis of rotation A of the holder 7. The holder 7 is for example defined by a wall of generally cylindrical or substantially cylindrical shape.

The optical element 5 is mounted so as to rotate as one with the holder 7 and is configured to be placed at the front of the holder 7. The expression "front of the holder 7" is understood to mean that portion of the holder 7 which is intended to be placed facing the road scene images of which the optical sensor 1 participates in capturing, when the protective device 3 is mounted on the motor vehicle. In contrast, the expression "rear of the holder 7" is understood to mean that portion of the holder 7 which is opposite the front of the holder 7 and which is therefore the portion that is furthest from the road scene.

Moreover, the holder 7 is preferably seal-tight.

The protective device 3 in addition comprises an actuator allowing the optical element 5 to be driven to rotate.

The actuator may be coupled to the holder 7 with a view to driving it to rotate. The optical element 5 is therefore configured to be driven to rotate with the holder 7 by the actuator, so as to allow the optical element 5 to be cleaned via a centrifugal effect.

The actuator is for example supplied with electrical power by a power supply that may be connected to the general electrical circuit of the motor vehicle. The actuator may be a motor 9, for example an electric motor, for driving the holder 7 to rotate. By way of non-limiting example, the motor may more particularly be a brushless motor.

In particular, the motor 9 comprises a fixed stator 91 and a rotor 93 that is rotatable about an axis of rotation with respect to the fixed stator 91. The motor 9 may have a speed of rotation of around 10000 revolutions/minute.

According to the illustrated embodiment, the motor 9 is arranged at the rear of the holder 7, on the side opposite the optical element 5. In this case, the axis of rotation of the motor 9 may be coincident with the axis of rotation A of the holder 7, and therefore with the optical axis.

Thus, the protective device 3 comprises a fixed portion comprising the stator 91, and a mobile portion comprising the rotor 93, the holder 7 and the optical element 5.

Furthermore, the driver-assistance system comprises at least one element for acquiring at least one piece of information representative of the angular position of the optical element 5. Such an acquiring element may in particular form part of the protective device 3, and be mounted on an element of the latter. Various embodiments may be envisioned in respect of acquisition of at least one piece of information representative of the angular position of the optical element 5.

Figure 2:
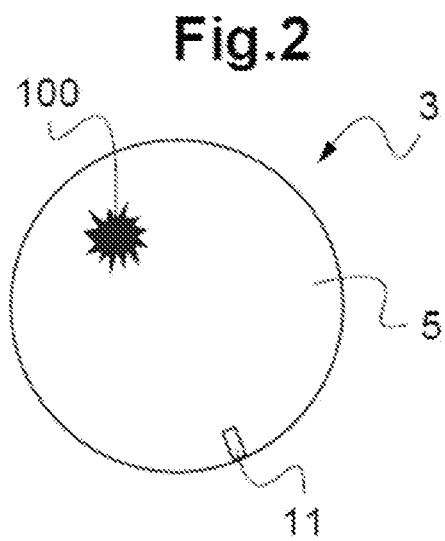
FIG. 2 is a front view of an optical element of the protective device of FIG. 1.

According to one embodiment, at least one acquiring element may take the form of a rotation indicator 11, a very schematic example of which is shown in FIG. 2.

The rotation indicator 11 may be placed on the optical element 5, so as to be in the field of view of the optical sensor. Thus, the rotation indicator 11 appears in the images captured by the optical sensor. In other words, when taking images, the optical sensor also "reads" this rotation indicator 11.

Such a rotation indicator 11 is commonly called an OPR indicator. It may be a reflective element, a bar-shaped reflective element for example. Such a bar is for example, non-limitingly, made of aluminum. According to another variant, the rotation indicator 11 may take the form of a known, non-random defect, such as an engraving, on the optical element 5.

In the example of FIG. 2, a single rotation indicator 11 has been shown. Of course, a plurality of rotation indicators, or OPR indicators, may be provided in order to improve detection of angular position.

Figure 3A:
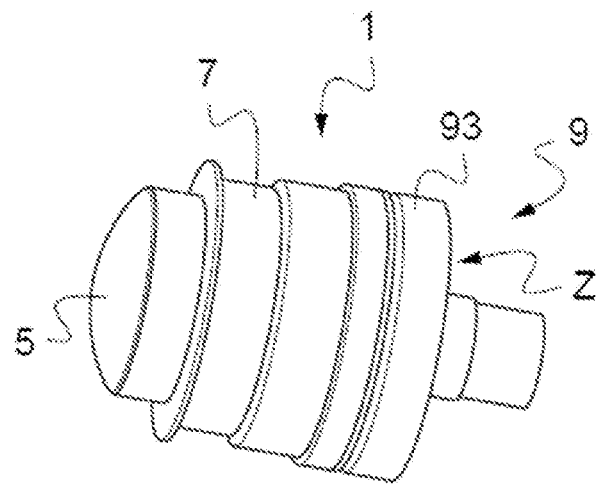
FIG. 3a is a perspective view of a mobile portion of the protective device of FIG. 1.
Figure 3B:
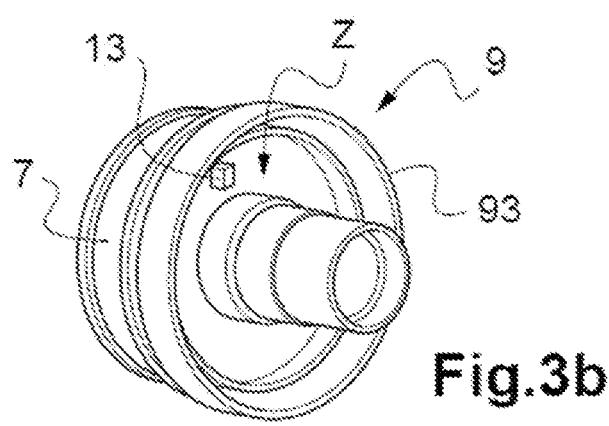

With reference to FIG. 3a and FIG. 3b, at least one acquiring element may be an angle sensor 13 that allows the rotationwise position of the optical element 5 to be determined. Preferably it is a sensor of absolute angle.

The angle sensor 13 may be placed on the mobile portion of the protective device 3, in particular on the optical element 5 or its holder 7, or on the rotor 93, for example in the region Z where the rotor 93 is coupled to the stator 91.

Non-exhaustively, the angle sensor 13 may be magnetic, optical and in particular employ a photodiode or phototransistor to detect reflection or transmission of light generated by a light-emitting diode or laser diode, or even holographic.

According to yet another embodiment, the angular position of the optical element 5 may be determined based on the phase currents of the motor 9. For this purpose, the protective device 3 comprises a measuring unit 15 (see FIG. 4) configured to measure phase currents of the motor 9. The measuring unit 15 for example comprises one or more measuring resistors such as shunts allowing the amplitude of the current to be measured.

Furthermore, the driver-assistance system comprises at least one processing unit 17. The processing unit 17 for example comprises at least one microprocessor or microcontroller.

It may be a question of a central processing unit 17, such as a central processor of the motor vehicle for example. In this case it is common to a plurality of optical sensors 1 and protective devices 3. In other words, it is able to exchange information with a plurality of pieces of equipment, and in particular with a plurality of optical sensors 1 and protective devices 3. Alternatively, the processing unit 17 could be associated with one optical sensor 1 and one protective device 3. It could for example be a question of a microprocessor or microcontroller that could be dimensioned to process one or more images captured by the associated optical sensor 1 in order to deliver a processed image to a control system of the motor vehicle for example.

Advantageously, the processing unit 17 may comprise one or more means for processing images acquired and transmitted by at least one optical sensor 1, when the motor vehicle is equipped with a plurality of optical sensors 1, or by the optical sensor 1 associated with the processing unit 17.

Such a processing unit 17 may also receive one or more pieces of information representative of the angular position of the optical element.

Again with reference to FIG. 2, according to one embodiment, the processing unit 17 may determine the angular position of the optical element 5 depending on the position of the rotation indicator 11, or rotation indicators 11, in the images captured by the optical sensor 1. Angular position is more precisely determined by at least one image-processing means of the processing unit 17. With this solution it is not necessary to arrange a particular measuring system on the protective device 3. The optical sensor 1, which is located behind the optical element 5, detects the rotation indicator 11, this providing information on the position of this rotation indicator 11, and by image processing the angular position of the optical element 5 is deduced.

It is also possible to use image processing with a few reference pixels, peripheral pixels for example, of the image illuminated through a disk equipped with windows of different widths. This is a different way of producing an element for acquiring at least one piece of information representative of the angular position of the optical element 5. This is in particular a variant of the rotation indicator 11 or OPR indicator described above. Specifically, instead of having a particular device with a target, i.e. the indicator 11, on the mobile portion of the protective device, which target is in particular illuminated with a light-emitting diode and passage of which is detected by virtue of a photodetector, it is possible for example to use a peripheral region of a CCD matrix array of the optical sensor 1 to detect passage of engravings or a succession of light and dark lines positioned directly on the lens (not shown) or protective optics (not shown) of the optical sensor 1. The acquired images may then be interpreted by the one or more image-processing means of the processing unit 17 in order to determine the angular position of the defect present on the lens of the optical sensor 1 and thus prevent it having any influence on image quality.

Alternatively or in addition, the processing unit 17 may receive one or more pieces of information in particular from at least one angle sensor 13 (FIG. 3a, FIG. 3b, and FIG. 4). The processing unit 17 may comprise analyzing means for analyzing and determining, depending on the received information, the angular position of the optical element 5.

According to yet another alternative, the processing unit 17 may determine the angular position of the optical element 5 based on one or more measurements of phase currents of the motor 9, these measurements being transmitted by the measuring unit 15. For this purpose, the processing unit 17 for example comprises at least one microcontroller able to measure a speed of rotation and an angular position of the motor 9, which is in particular a brushless motor. As a variant or in addition, the processing unit 17 may comprise at least one integrated circuit, in particular comprising voltage amplifiers allowing measurement of phase currents.

Moreover, it is possible for a defect 100 resistant to a cleaning cycle, for example one involving spraying a cleaning fluid, to be present on the optical element 5, as schematically shown in a very simplified way in FIG. 2. It may also be an impact or a scratch having damaged the optical element 5 or even dirt or a deposit that is very hard to remove, such as tar for example.

With reference to FIG. 2 and FIG. 4, the processing unit 17 is configured to detect when a defect 100 is present in the field of view of the optical sensor 1. Image processing may be used to achieve this detection.

The processing unit 17, and more precisely the one or more image-processing means, may determine the angular position of the defect 100 in the images captured by the optical sensor 1. The angular position of the defect 100 may be deduced based on the angular position of the optical element 5, itself determined based on one or more pieces of information received from at least one acquiring element, examples of which were described above.

In the event of detection of a defect 100, the processing unit 17 may be configured to remove by image processing the defect then appearing in the images captured by the optical sensor. This removal is performed taking into account the determined angular position of the defect 100.

For this purpose, the capture of images by the optical sensor 1 may be synchronized with the speed of rotation of the optical element 5. This synchronization makes it possible to eliminate the noise generated by the presence of this defect 100 rotating in front of the optical sensor 1.

To this end, the processing unit 17 may also receive and analyze at least one piece of information representative of the speed of rotation of the optical element 5, or determine this speed of rotation.

According to one embodiment, speed of rotation may be determined based on the angular position of the optical element 5. The processing unit 17 may comprise at least one processing or computing means for deriving position with respect to time in order to deduce therefrom the speed of rotation of the optical element 5. By way of non-limiting example, time-related information may be obtained by virtue of an internal clock of a microcontroller, of the processing unit 17 for example, by measuring the time between two passes of the rotation indicator 11, or by precisely measuring phase currents.

This speed of rotation makes it possible to compute the movement of the defect 100 in front of the optics of the optical sensor 1, which runs the risk of generating a relatively circular blurred or darkened region in the images taken by this optical sensor 1.

Based on the speed of rotation, the processing unit 17 is able to define a frequency of image capture by the optical sensor 1. This frequency is chosen so that, on each image capture, the defect 100 is in the same angular position. In other words, the optical sensor 1 takes an image when the optical element 5 is placed so that the defect 100 is always in the same place. The optical sensor 1 may for example take one image per revolution, this being sufficient for the human eye.

It is also possible to define more than one angular position of the defect 100 for the purposes of synchronization. In this case, the frequency is chosen so that, on each image capture, the defect 100 is in one of the defined angular positions. In other words, the optical sensor 1 takes an image when the optical element 5 is placed so that the defect 100 is always in one of the precise identified places in the image. For example, also with reference to FIG. 5, the optical sensor 1 may take one image per half-revolution.

When the image capture is synchronized with the speed of rotation of the optical element, the defect 100, which is always found at at least one precise location in the captured images, may be removed, i.e. extracted, by image processing. To this end, the processing unit 17, in particular said at least one image-processing means, may filter the captured images so as to extract the image of the defect 100.

According to one particular example of embodiment, this filtering may cause a region containing the defect to be removed from a plurality of images and these images to be superposed so as to reconstruct a defect-free image.

In the very simplified example shown schematically in FIG. 5, the optical sensor is configured to capture at least two consecutive images i1, i2. For example, the optical sensor may take one image i1, i2 per half-revolution of the optical element 5. With a speed of rotation of about 10000 revolutions per minute, these two images i1, i2 are taken at times that are very close together. In these two consecutive images i1, i2, which are taken very rapidly, the surrounding landscape and the road scene will not have had time to change, i.e. to move, significantly in the images i1, i2, while the defect 100 for its part moves very quickly. The defect 100, or rather its image, is in this example in the upper region i11 of the first image i1 and in the lower region i22 of the second image i2, with regard to the orientation of FIG. 5.

By image processing, regions containing the defect 100 may be extracted and regions devoid of defect may be superposed so as to construct a new image i3. Thus, in this example, the new image i3 may be constructed by superposing the two images i1, i2. The top region i11 of the first image i1 may be extracted and the defect-free bottom region i12 of the first image i1 may be preserved, as symbolized by the arrow F1. Similarly, the bottom region i22 of the second image i2 may be extracted and the defect-free top region i21 of the second image i2 may be preserved, as symbolized by the arrow F2. The new image i3 is obtained, as symbolized by the arrow F3, based on the top region i21 of the second image i2 and the bottom region i22 of the second image i2. The defect is no longer visible in this new constructed image i3.

Image-Processing Method

Generally, the method comprises at least one step of detecting the presence of at least one defect 100 on the optical element 5 of the protective device 3. This step may be implemented by the processing unit 7 described above, for example by image processing.

In the event of detection of a defect 100, the method comprises at least one step of acquiring at least one piece of information representative of at least one angular position of the optical element 5 during capture of at least one image by the optical sensor 1. This acquiring step may be implemented at least in part by means of one or more acquiring elements 11, 13, 15 such as described above. The processing unit 7 may receive information representative of the angular position of the optical element 5.

There follows at least one step of determining, based on this representative information, at least one angular position of the defect 100 on the optical element 5. This step may be implemented by the processing unit 7, and in particular by one or more image-analyzing and/or -processing means of the processing unit 7.

In particular, in the event of detection of a defect 100 on the optical element 5 in the field of view of the optical sensor 1, the method comprises at least one step of determining the angular position of the optical element 5 based on at least one representative piece of information received from at least one acquiring element 11, 13, 15 such as described above, with a view to deducing therefrom, in particular by image processing, the angular position of the defect 100 on one or more images captured by the optical sensor 1.

In a following step, the defect 100 may be removed by image processing from at least one image captured by the optical sensor 1, taking into account the angular position of the defect 100 on the optical element 5 as determined in a previous step. This removing step may be implemented by the processing unit 7, and in particular by one or more image-processing means of the processing unit 7.

Advantageously, the method further allows image capture to be synchronized with the speed of rotation of the optical element 5.

The speed of rotation of the optical element 5 may for example be determined by the processing unit 17 or acquired via a measuring system embedded in the protective device 3.

Based on the speed of rotation, the capture of images by the optical sensor 1 is synchronized with the speed of rotation of the optical element 5. This synchronization may be performed by the processing unit 17, which defines a frequency of image capture so that, on each image capture, the defect 100 is in a defined angular position. This angular position may always be the same, or a plurality of angular positions may be defined.

Subsequently, the method comprises one or more image-processing steps to remove the defect 100 appearing in the images captured in a way synchronized with the speed of rotation of the optical element 5, for example by filtering the image regions containing the defect 100 and superposing these images so as to reconstruct a defect-free image.

Thus, the protective device 3 according to any of the variants described above makes it possible at least to acquire and transmit rotation information to the processing unit 17, which may then remove the defect appearing in the images captured by the optical sensor 1. In particular, the processing unit 17 allows the capture of images to be synchronized with the speed of rotation and the captured images to be filtered so as to extract the defect 100.

This processing unit 17 may be integrated into the protective device 13 or form part of a central processor of the motor vehicle.

This makes it possible to increase the service interval of the protective device 3 and to continue driving using it despite the defect 100 in the field of view of the optical sensor 1, because the system 1 is capable of filtering the noise caused by the rapid rotation of the defect in front of the optical sensor 1.

What is claimed is:

1. A driver-assistance system comprising:
   at least one optical sensor including optics and configured to capture at least one image along an optical axis, and
   at least one protective device associated with the at least one optical sensor, the device including a transparent optical element that is rotatably mounted upstream of the optics of the associated optical sensor along the optical axis, and a motor configured to drive the optical element to rotate about an axis of rotation, so as to allow the optical element to be cleaned via a centrifugal effect, with
   the at least one protective device including at least one element for acquiring at least one piece of information representative of at least one angular position of the optical element during capture of at least one image by the associated optical sensor, a processing unit configured to:
      detect the presence of at least one defect on the optical element,
      receive the at least one piece of information representative of the at least one angular position of the optical element,
      determine, based on the at least one received representative piece of information, at least one angular position of the at least one defect on the optical element, and
      remove by image processing the at least one defect from the at least one image captured by the at least one optical sensor, taking into account the at least one determined angular position of the at least one defect on the optical element.

2. The system as claimed in claim 1, wherein the processing unit is configured to:
   determine the at least one angular position of the optical element based on the at least one received representative piece of information, and
   deduce, from the at least one determined angular position of the optical element, the at least one angular position of the at least one defect on the optical element.

3. The system as claimed in claim 1, wherein the processing unit is configured to:
   receive or determine at least one piece of information representative of the speed of rotation of the optical element, and
   synchronize the image capture with the speed of rotation of the optical element.

4. The system as claimed in claim 1, wherein the at least one acquiring element includes a rotation indicator placed on the optical element, and arranged to be in the field of view of the associated optical sensor.

5. The system as claimed in claim 1, wherein the at least one acquiring element includes an angle sensor.

6. The system as claimed in claim 1, wherein the at least one acquiring element includes a measuring unit configured to measure phase currents of the motor.

7. The system as claimed in claim 1, wherein the processing unit is configured to define, depending on the speed of rotation of the optical element, an image-capture frequency, so that, on each image capture, the at least defect is in the at least one determined angular position in the captured image.

8. The system as claimed in claim 7, wherein the processing unit includes at least one image-processing means configured to extract the at least one defect located in the at least one determined angular position in the captured image.

9. The system as claimed in the claim 8, wherein:
   the at least one optical sensor is configured to capture at least two consecutive images, and wherein
   the at least one image-processing means is configured to:
      extract from the at least two images at least one region containing the at least one defect, and to
      superpose the at least two images, so as to construct a new image devoid of the at least one defect.

10. A method for processing captured images, for a driver-assistance system with at least one optical sensor and an associated protective device, comprising:
    detecting the presence of at least one defect on the optical element of the protective device,
    receiving at least one piece of information representative of the at least one angular position of the optical element during capture of at least one image by the optical sensor,
    determining, based on the at least one received representative piece of information, at least one angular position of the optical element,
    deducing, from the at least one determined angular position of the optical element, the at least one angular position of the at least one defect on the optical element, and removing by image processing the at least one defect from the at least one image captured by the at least one optical sensor, taking into account the at least one determined angular position of the at least one defect on the optical element.

11. A driver-assistance system comprising:

at least one optical sensor including optics and configured to capture at least one image along an optical axis, and at least one protective device associated with the at least one optical sensor, the device including a transparent optical element that is rotatably mounted upstream of the optics of the associated optical sensor along the optical axis, and a motor configured to drive the optical element to rotate, with the at least one protective device including at least one element for acquiring at least one piece of information representative of at least one angular position of the optical element during capture of at least one image by the associated optical sensor, a processing unit configured to:

detect the presence of at least one defect on the optical element, receive the at least one piece of information representative of the at least one angular position of the optical element, determine, based on the at least one received representative piece of information, at least one angular position of the at least one defect on the optical element, remove by image processing the at least one defect from the at least one image captured by the at least one optical sensor, taking into account the at least one determined angular position of the at least one defect on the optical element receive or determine at least one piece of information representative of the speed of rotation of the optical element, and synchronize the image capture with the speed of rotation of the optical element.

* * * * *